US008326543B2

(12) United States Patent
Nemeth et al.

(10) Patent No.: US 8,326,543 B2
(45) Date of Patent: Dec. 4, 2012

(54) SYSTEM AND METHOD FOR ATTENUATING MULTIPLES IN SEISMIC DATA THAT ACCOUNTS FOR BEAM AZIMUTH

(75) Inventors: Tamas Nemeth, San Ramon, CA (US); Norman Ross Hill, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 461 days.

(21) Appl. No.: 12/623,225

(22) Filed: Nov. 20, 2009

(65) Prior Publication Data

US 2011/0125406 A1  May 26, 2011

(51) Int. Cl.
*G01V 1/02* (2006.01)
(52) U.S. Cl. .............................. 702/14; 702/5; 702/127
(58) Field of Classification Search ............... 702/5, 14, 702/127; 367/912; 324/0.5; 181/101; 73/570
See application file for complete search history.

(56) References Cited

U.S. PATENT DOCUMENTS

| | | | |
|---|---|---|---|
| 4,887,243 A | 12/1989 | Pann | |
| 5,051,960 A | 9/1991 | Levin | |
| 5,274,605 A | 12/1993 | Hill | |
| 5,986,973 A | 11/1999 | Jericevic et al. | |
| 6,169,959 B1 | 1/2001 | Dragoset, Jr. | |
| 6,507,787 B1 | 1/2003 | Filpo Ferreira Da Silva et al. | |
| 6,735,527 B1 | 5/2004 | Levin | |
| 6,807,489 B2 * | 10/2004 | Naville et al. ................... 702/17 |
| 6,832,161 B1 | 12/2004 | Moore | |
| 7,149,630 B2 | 12/2006 | Abma | |
| 7,715,986 B2 * | 5/2010 | Nemeth et al. .................. 702/14 |
| 2008/0294346 A1 | 11/2008 | Nemeth et al. | |

OTHER PUBLICATIONS

U.S. Appl. No. 11/751,975, filed May 22, 2007, Nemeth.
Berryhill et al., Deep-Water Peg Legs and Multiples: Emulation and Suppression, Geophysics, 1986 Society of Exploration Geophysicists, Dec. 1986, pp. 2177-2184, vol. 51, No. 12.
Zhao et al., Application of a Model-Based Multiple Attenuation Method to a Gulf of Mexico Deepwater Dataset, The Leading Edge, Mar. 2005, pp. 285-290.
Lu et al., Model-Based Removal of Water-Layer Multiple Reflections, Geophysics, 1999 Society of Exploration Geophysicists. Nov.-Dec. 1999, pp. 1816-1827, vol. 64, No. 6, 18 Figures.
Pica et al., 3D Surface-Related Multiple Modeling, Principles and Results, SEG/Houston 2005 Annual Meeting, SPMUL 1.5, pp. 2080-2084.
Pica et al., 3D Surface-Related Multiple Modeling, The Leading Edge, Mar. 2005, pp. 292-296.
Reshef et al., Multiple Prediction Without Prestack Data: An Efficient Tool for Interpretive Processing, Technical Article, First Break, 2003 EAGE, Mar. 2003, pp. 29-37, vol. 21.

(Continued)

*Primary Examiner* — Michael Nghiem
*Assistant Examiner* — Elias Desta
(74) *Attorney, Agent, or Firm* — Marie L. Clapp

(57) ABSTRACT

The present invention incorporates the use of model-driven and data-driven methodologies to attenuate multiples in seismic data utilizing a prediction model which includes multiply-reflected, surface-related seismic waves. The present invention includes beam techniques that account for beam azimuth, and convolving a predicted multiples beam with a segment of a modeled pegleg beam to obtain a convolved multiples beam. The convolved multiples beam can then be deconvolved to attenuate the multiples that are present in the original input beam.

15 Claims, 11 Drawing Sheets

OTHER PUBLICATIONS

Stork et al., Predicting and Removing Complex 3D Surface Multiples with WEM Modeling—An Alternative to 3D SRME for Wide Azimuth Surveys?, SEG/New Orleanse 2006 Annual Meeting, pp. 2679-2683.

Verschuur et al., Adaptive Surface-Related Multiple Elimination, Geophysics, 1992 Society of Exploration Geophysicists, Sep. 1992, pp. 1166-1177, vol. 57, No. 9, 12 Figures.

Wiggins, Attenuation of Complex Water-Bottom Multiples by Wave-Equation-Based Prediction and Subtraction, Geophysics, 1988 Society of Exploration Geophysicists, Dec. 1988, pp. 1527-1539, vol. 53, No. 12, 9 Figures.

Wiggins, Multiple Attenuation by Explicit Wave Extrapolation to an Interpreted Horizon, The Leading Edge, Jan. 1999, pp. 46-54.

* cited by examiner

SYSTEM AND METHOD FOR ATTENUATING MULTIPLES IN SEISMIC DATA THAT ACCOUNTS FOR BEAM AZIMUTH

FIELD OF THE INVENTION

This invention relates to seismic exploration and processing, and more specifically to imaging with beams and a method to predict multiples based on primaries by combining both model-driven and data-driven methodologies.

BACKGROUND OF THE INVENTION

In the petroleum industry, seismic prospecting techniques are commonly used to aid in the search for and the evaluation of subterranean hydrocarbon deposits. In seismic prospecting, one or more sources of seismic energy emit waves into a subsurface region of interest such as a geologic formation. These waves enter the formation and may be scattered, e.g., by reflection or refraction, by subsurface seismic reflectors (i.e., interfaces between underground formations having different elastic properties). The reflected signals are sampled or measured by one or more receivers, and the resultant data are recorded. The recorded samples may be referred to as seismic data or a set of "seismic traces". The seismic data may be analyzed to extract details of the structure and properties of the region of the earth being explored.

Seismic prospecting consists of three separate stages: data acquisition, data processing and data interpretation. The success of a seismic prospecting operation depends on satisfactory completion of all three stages.

In general, the purpose of seismic exploration is to map or image a portion of the subsurface of the earth (a formation) by transmitting energy down into the ground and recording the "reflections" or "echoes" that return from the rock layers below. The energy transmitted into the formation is typically sound and shear wave energy. The downward-propagating sound energy may originate from various sources, such as explosions or seismic vibrators on land or air guns in marine environments. Seismic exploration typically uses one or more energy sources and typically a large number of sensors or detectors. The sensors that may be used to detect the returning seismic energy are usually geophones (land surveys) or hydrophones (marine surveys).

During a surface seismic survey, the energy source may be positioned at one or more locations near the surface of the earth above a geologic structure or formation of interest, referred to as shotpoints. Each time the source is activated, the source generates a seismic signal that travels downward through the earth and is at least partially reflected from discontinuities of various types in the subsurface, including reflections from "rock layer" boundaries. In general, a partial reflection of seismic signals may occur each time there is a change in the elastic properties of the subsurface materials. Reflected seismic signals are transmitted back to the surface of the earth, where they are recorded as a function of traveltime at a number of locations. The returning signals are digitized and recorded as a function of time (amplitude vs. time).

One prevalent issue with the seismic energy recorded by the receivers during the data acquisition stage is that the seismic traces often contain both the desired seismic reflections (the "primary" reflections) and unwanted multiple reflections which can obscure or overwhelm the primary seismic reflections. A primary reflection is a sound wave that passes from the source to a receiver with a single reflection from a subsurface seismic reflector. A multiple reflection is a wave that has reflected at least three times (up, down and back up again) before being detected by a receiver. Depending on their time delay from primary events with which they are associated, multiples are commonly characterized as short-path, implying that they interfere with their own primary reflection, or long-path, where they appear as separate events.

There are also a variety of multiple events which are well known in the art. There are signals which are "trapped" in the water layer between two strong reflectors, the free surface and the bottom of the water layer. There are "peg-leg" multiple events, which are reflections that are characterized by an additional roundtrip through the water layer just after emission or just before detection. There are "remaining" surface-related multiple events, where the first and last upward reflections are below the first (water) layer, and there is at least one reflection at the free surface in between. There are also "inter-bed" multiples which have a downward reflection occurring from a subsurface reflector.

In most cases, multiples do not contain any useful information that is not more easily extracted from primaries. Moreover, water-bottom multiples have been recognized as the most serious noise problem in seismic data processing in many offshore areas. Multiples can severely mask primary reflection events for structural imaging and contaminate Amplitude vs. Offset ("AVO") information. For those reasons, removal of multiples, or at least attenuation of multiples is a necessary part of the seismic data processing stage in many environments, particularly in marine settings where multiples are especially strong relative to the primaries.

In the case of deep-water data, suppression of first-order and the next few orders of sea-bottom multiple and peg-leg reflections are of great importance. These rather strong multiples may have the same travel time as the primary reflections of target reflectors.

There are several prior art methods to attenuate multiples depending on the attributes of the multiples utilized. One class of multiple attenuation methods is the predictive methods where the multiples are predicted from their respective primaries. Prior art predictive multiple attenuation techniques can be generally divided into two categories; model-driven methodologies and data-driven methodologies. Model-driven methodologies generally use an earth model and the recorded data to predict or simulate multiples utilizing the estimated sea-bottom reflectivity function and calculated amplitude functions to model water-layer multiple reflections, those predicted multiples are then subtracted from the original data. Other model-driven technologies utilize an earth model or reflectivity model to predict the stationary multiples. The data-driven methodologies exploit the fact that primaries and multiples are physically related through a convolutional relationship and predict multiples by crossconvolving the relevant primaries thought to contain the stationary contributions for multiples. Data-driven methodologies can generally handle complex geometries and need little or no information about the properties of the subsurface. The model-based technologies are typically cost-effective compared to data-driven technologies, while the latter are typically more flexible.

Some model-driven methodologies require structural information, i.e., information about the subsurface structure, the determination of which is the reason for doing seismic exploration in the first place. Other model-driven methodologies require the shape of the source wavelet that will not be a pure delta function because of the reverberations and frequency bandwidth limitation. Some model-driven methodologies require both structural and source wavelet information while others use a matching filter to account for a distorted source wavelet.

Data-driven methodologies rely on the predictability of multiples from primary components. In effect, that methodology utilizes existing seismic data to generate multiples and those generated multiples are then subtracted from the existing data. One such prior art methodology that is data-driven is known as "surface-related multiple elimination" or "SRME".

In brief, this method operates by utilizing the existing data to create a dataset that contains only predictions of the multiples that are present in the data. Specifically, the method seeks to predict the seismic expression of multiples, and after adaptation to the existing multiples in the data the predicted multiples are subtracted from the original data leaving behind (at least theoretically) only the primary energy.

Data-driven SRME techniques are attractive solutions for predicting multiples in complex geologic settings, they do not require any a-priori knowledge of the subsurface (reflectivity, structures and velocities). However, these methods do require one shot location for each receiver position, and this is not the case for most three dimensional ("3D") acquisition geometries. SRME methodologies are generally challenged by complex 3D multiples because of large shot spacing, narrow spread length and/or wide cable spacing. The missing data can be interpolated or extrapolated from the existing data, but interpolation of extrapolation has trouble with aliased seismic data caused by the large shot and/or receiver spacing. Advanced interpolation or extrapolation methods can also be difficult to implement and expensive. A common cause of these complex 3D data that challenge 3D SRME methods is rugosity on the top of salt. But, any type of complex overburden can cause complex 3D seismic data that is hard to interpolate.

Another data-driven methodology utilizes predictive deconvolution which is a filtering method that assumes that multiples are periodic while primaries are not. This assumption is usually met for data from water depths less than 500 msec (approximately 1,200 feet) and approximately layered subsurface geology. In areas of water depths greater than 500 msec where the velocity difference between primaries and multiples are significant, velocity-filtering methods (as opposed to predictive methods) such as tau-p and f-k filtering can be used, where the variable f represents frequency, k represents the wave-number, p represents the ray parameter, and tau represents the zero offset intercept time.

However, filtering methods generally require determination, or at least an educated guess, of the apparent wave propagation velocities in the subsurface media through which the reflected seismic waves pass in their journey from the seismic source to a receiver. These velocities can differ significantly due to the combination of the variations of the subsurface structure and rock properties. In addition, predictive deconvolution often leads to inadvertent damage to the primaries due to the difficulty in separating the multiples and primaries. Moreover, predictive deconvolution often fails to take into account the nonlinear factor in the reflectivity, which are generally caused by peg-leg multiples.

SUMMARY OF THE INVENTION

One aspect of the invention relates to a computer-implemented method of attenuating multiply reflected, surface-related seismic waves, wherein the method is implemented in a computer system comprising one or more processors configured to execute one or more computer program modules. In one embodiment, the method comprises obtaining a beam dataset derived from wide-azimuth seismic data related to a geological volume, wherein the beam dataset includes information describing properties of a plurality of beams of seismic data through the geological volume, and wherein the properties of the plurality of beams described by the beam dataset include azimuth; selecting an input beam from the plurality of beams for which properties are described by the beam dataset; determining properties of a pegleg arrival corresponding to the input beam, wherein the pegleg arrival is determined based in part on the information in the beam dataset describing properties of the input beam, including the azimuth of the input beam, and wherein the properties of the pegleg arrival determined include the azimuth of the pegleg arrival; identifying a primary beam that corresponds to the pegleg arrival, wherein identifying the primary beam comprises identifying a beam described by the beam dataset having properties that correspond to the determined properties of the pegleg arrival, including a beam azimuth that corresponds to the beam azimuth of the pegleg arrival; and adjusting information in the beam dataset describing properties of the input beam to remove one or more multiple arrivals associated with the primary beam from the input beam. Another aspect of the invention relates to a computer system configured to attenuate multiply reflected, surface-related seismic waves. In one embodiment, the system comprises one or more processors configured to execute one or more computer program modules. The one or more computer program modules may comprise a dataset module, an input beam module, a pegleg module, a primary beam module, and an adjustment module. The dataset module is configured to obtain a beam dataset derived from wide-azimuth seismic data related to a geological volume, wherein the beam dataset includes information describing properties of a plurality of beams of seismic data through the geological volume, and wherein the properties of the plurality of beams described by the beam dataset include azimuth. The input beam module is configured to select an input beam from the plurality of beams for which properties are described by the beam dataset. The pegleg module is configured to determine properties of a pegleg arrival corresponding to the input beam, wherein the pegleg arrival is determined based in part on the information in the beam dataset describing properties of the input beam, including the azimuth of the input beam, and wherein the pegleg module is further configured such that the properties of the pegleg arrival determined include the azimuth of the pegleg arrival. The primary beam module is configured to identify a primary beam that corresponds to the pegleg arrival, wherein the primary beam module is configured to identify the primary beam by identifying a beam described by the beam dataset having properties that correspond to the determined properties of the pegleg arrival, including a beam azimuth that corresponds to the beam azimuth of the pegleg arrival. The adjustment module is configured to adjust information in the beam dataset describing properties of the input beam to remove one or more multiple arrivals associated with the primary beam from the input beam. Removal of multiple arrivals from the input beam provides enhanced accuracy and/or precision in imaging the geologic volume of interest based on the input beam (e.g., in conjunction with other input beams from which multiple arrivals have been removed).

Yet another aspect of the invention relates to a computer-implemented method of attenuating multiply reflected, surface-related seismic waves, wherein the method is implemented in a computer system comprising one or more processors configured to execute one or more computer program modules. In one embodiment, the method comprising obtaining a beam dataset derived from wide-azimuth seismic data related to a geological volume, wherein the beam dataset includes information describing properties of a plurality of beams of seismic data through the geological volume, and wherein the properties of the plurality of beams described by the beam dataset include azimuth; selecting an input beam from the plurality of beams for which properties are described by the beam dataset; determining properties of a first pegleg arrival corresponding to the input beam, wherein the first pegleg arrival is determined based in part on the information in the beam dataset describing properties of the input beam, including the azimuth of the input beam, and wherein the properties of the first pegleg arrival determined include the azimuth of the first pegleg arrival; identifying a first primary beam that corresponds to the first pegleg arrival, wherein identifying the first primary beam comprises identifying a beam described by the beam dataset having properties that correspond to the determined properties of the first pegleg arrival, including a beam azimuth that corresponds to the beam azimuth of the first pegleg arrival; determining properties of a first model pegleg arrival related to the first primary beam based at least in part on the properties of the first primary beam described by the beam dataset, wherein the properties of the first model pegleg arrival include the azimuth of the first model pegleg arrival; convolving the first model pegleg arrival with the first primary beam to determine properties of a first convolved multiples beam, wherein the determined properties of the first convolved multiples beam include azimuth; determining properties of a second pegleg arrival corresponding to the input beam, wherein the second pegleg arrival is determined based in part on the information in the beam dataset describing properties of the input beam, including the azimuth of the input beam, and wherein the properties of the second pegleg arrival determined include the azimuth of the second pegleg arrival; identifying a second primary beam that corresponds to the second pegleg arrival, wherein identifying the second primary beam comprises identifying a beam described by the beam dataset having properties that correspond to the determined properties of the second pegleg arrival, including a beam azimuth that corresponds to the beam azimuth of the second pegleg arrival; determining properties of a second model pegleg arrival related to the second primary beam based at least in part on the properties of the second primary beam described by the beam dataset, wherein the properties of the second model pegleg arrival include the azimuth of the second model pegleg arrival; convolving the second model pegleg arrival with the second primary beam to determine properties of a second convolved multiples beam, wherein the determined properties of the second convolved multiples beam include azimuth; accumulating a plurality of convolved multiples beams, wherein the plurality of convolved multiples beams comprise the first convolved multiples beam and the second convolved multiples beam; adjusting information in the beam dataset describing properties of the input beam to account for the accumulated plurality of convolved multiple beams.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
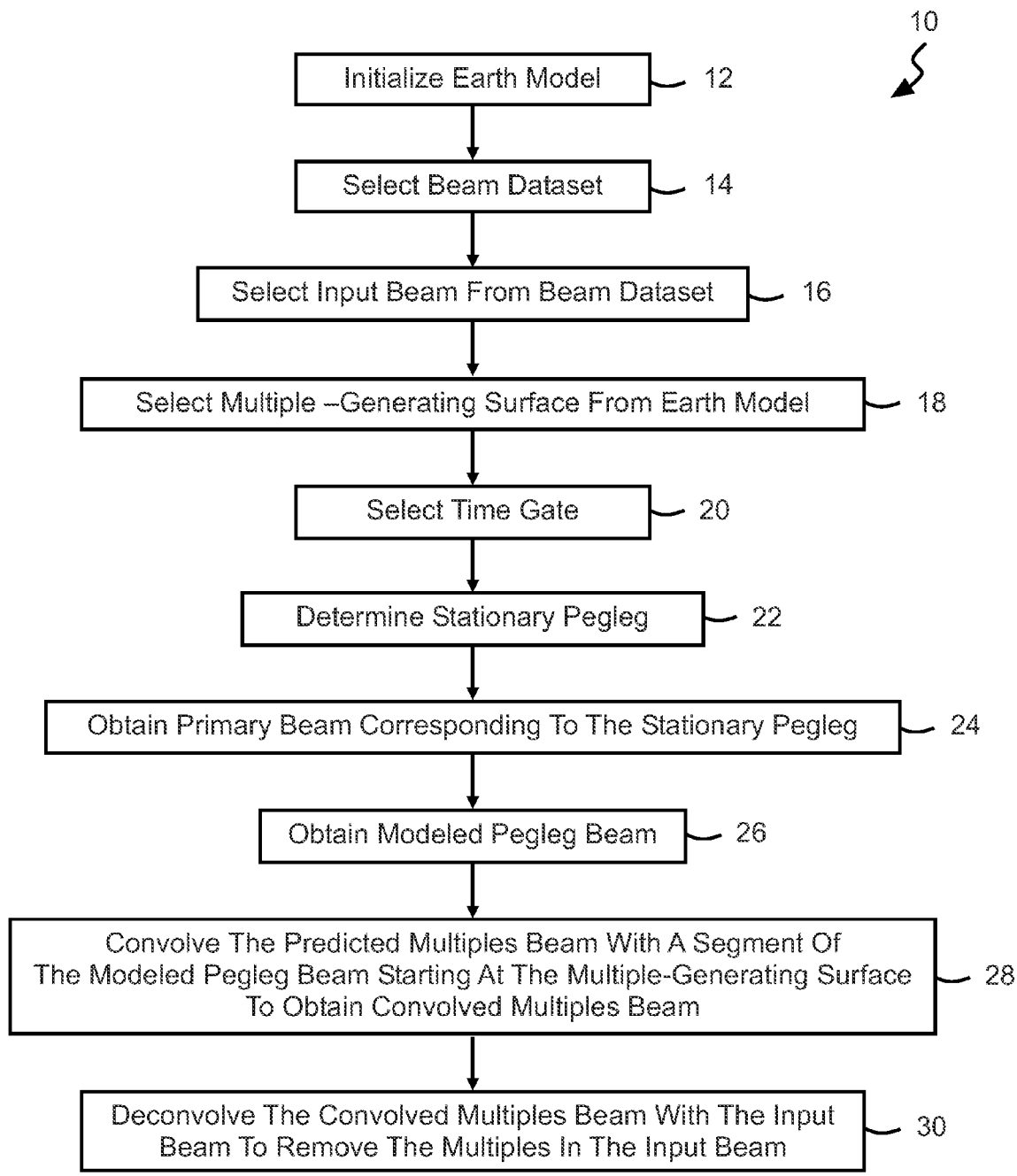
FIG. 1 illustrates a flow chart of one embodiment of the present invention for attenuating multiples in seismic data.

FIG. 1 illustrates a method 10 of removing multiples from imaging a geologic volume of interest. The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 1 and described below is not intended to be limiting.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

As shown in FIG. 1, method 10 includes an operation 12, at which an earth model that corresponds to the geological volume of interest is initialized. At an operation 14, a beam dataset derived from seismic data collected in the geological volume of interest is selected. The seismic data is wide-azimuth data or other data types where the azimuth information is an attribute. As used herein, "azimuth" or "azimuth information" refers to information that identifies a directional orientation in the horizontal of the propagation of seismic energy within the geologic volume of interest. For example, "azimuth" may refer to an angle between a line between a source and a detector and some reference direction in the horizontal plane. The beam data set includes information describing properties of a plurality of beams of seismic data through the geological volume of interest. The properties of the plurality of beams described by the beam data set include azimuth. Other properties described by the beam data set may include one or more of the midpoint and offset coordinates of central ray path, dip at the central ray location, trace sequence values associated with the central ray, and/or other properties.

An input beam from the beam dataset derived at operation 14, a multiple-generating surface from the earth model initialized at operation 12, and a time gate are selected at operations 16, 18, and 20, respectively. The multiple-generating surface may be described in three-dimensions.

Utilizing the input beam from operation 16, the multiple generating surface from operation 18, and the time gate from operation 20, a stationary pegleg is determined at an operation 22. As is discussed further below, determining the stationary pegleg includes performing ray-tracing along the path of the selected input beam to determine a path of the stationary pegleg caused in part by reflection at the multiple generating surface. Determining the stationary pegleg includes determining properties of the stationary pegleg, including the azimuth of the stationary pegleg.

A primary beam corresponding to the stationary pegleg is then obtained at an operation 24. Obtaining the primary beam includes identifying a beam from the beam data set with properties that correspond to the properties of the stationary pegleg. One of the properties that is checked for correspondence in obtaining the primary beam is azimuth.

A modeled pegleg beam related to the primary beam is obtained at an operation 26. Modeling the pegleg beam includes determining properties of a pegleg beam that would be generated by reflection of the primary beam (obtained at operation 24) at the multiple generating surface selected at operation 18.

At an operation 28, the modeled pegleg beam (obtained at operation 26) is convolved with the primary beam (obtained at operation 24) to determine a convolved multiples beam. The convolved multiples beam is then deconvolved with the input beam to remove the multiples in the input beam at an operation 30. As used herein, convolution of beams to "determine" or "obtain" a beam will be appreciated to include performing a convolution of the convolved beams resulting in the determination of the properties of the "determined" or "obtained" beam.

In one embodiment, rather than obtaining a primary beam from the beam dataset at operation 24, properties of the primary beam may be predicted based on the properties of the stationary pegleg determined at operation 22, and the predicted primary beam can be directly convolved with the modeled pegleg beam at operation 28.

In one embodiment, rays are sprayed from a detector location and the stationary pegleg is determined based upon one of the rays. The detector location in such an embodiment is based upon the input beam selected at operation 16.

In one embodiment, at operation 28 a segment of the modeled pegleg beam is convolved with the primary beam to obtain a convolved multiples beam. The segment of the modeled pegleg beam may start at the multiple-generating surface and may involve a time interval that is either explicitly specified or is determined by another horizon, or multiples-generating surface, in the earth model. The convolved multiples beam may then be deconvolved with the input beam at operation 30 to remove the multiples in the input beam.

Figure 2:
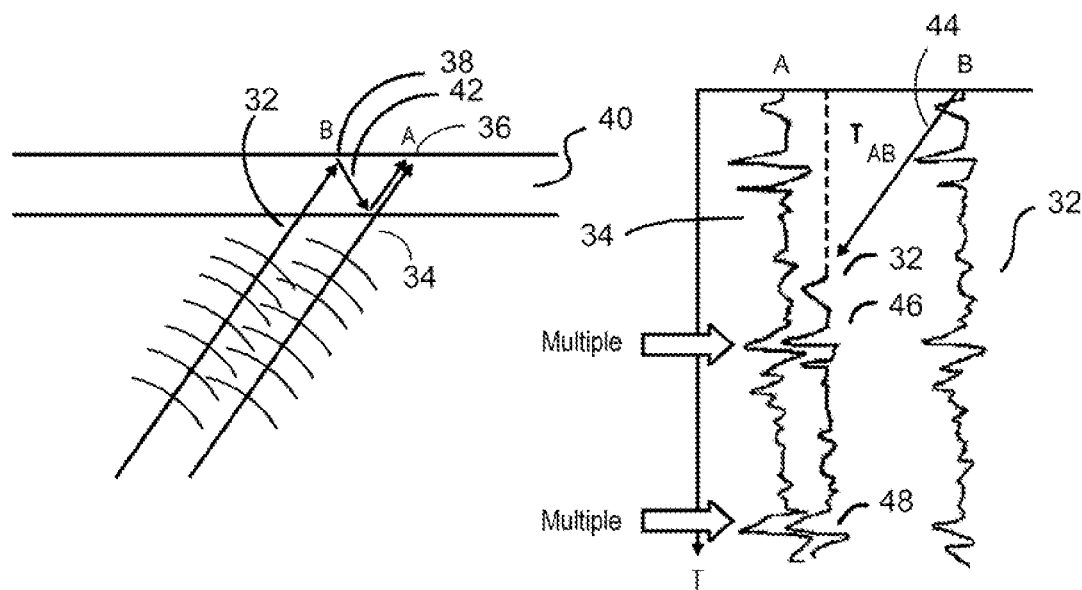
FIG. 2 illustrates one embodiment of the present invention which includes transforming a primary beam into a predicted multiples beam.

Conventional techniques for removing multiples from beams have used local slant stacking or other dip-discriminating methods for seismic traces to separate a recorded wavefield into beam components. The present invention utilizes local slant stacking to separate the recorded wavefield into components that are localized in both position and dip. These components are what would be recorded at the center of beam arrivals 32 and 34 at locations A 36 and B 38 as illustrated in FIG. 2. The beam energy 32 that arrives at location B 38 reverberates in the a layer 40 that is bounded by reflective surfaces. For example, layer 40 may include a water layer. As a result of this reverberation, beam energy 32 is assumed to arrive as multiples 42 within beam 34 recorded at location A 36. Shifting beam 32 by the raytrace traveltime $T_{AB}$ 44 from location B 38 to location A 36 will line up the events in beam 32 with the multiples 46 and 48 in beam 34. Once the events have been aligned and the multiples 46 and 48 are identified, the multiples 46 and 48 can then be removed.

When the local slant stacking described-above is used for 3D acquisition, the recorded energy cannot be completely steered into beams because the wavefield is not densely sampled along all recording directions, thus there is an issue of missing data or severe aliasing that is needed to accurately determine the raytrace traveltime $T_{AB}$. For example, as one skilled in the art will appreciate, the local slant stacking is accomplished in the common-offset domain but, not in the common-midpoint domain. In one embodiment of the present invention, an assumption is made that stacking velocities describe the dip of primary events in common-midpoint ("CMP") gathers. In general, stacking velocities are a reasonable description of primaries from geological structures above the subsurface salt formations, which can reverberate in marine environments to become the strongest multiples.

Figure 3:
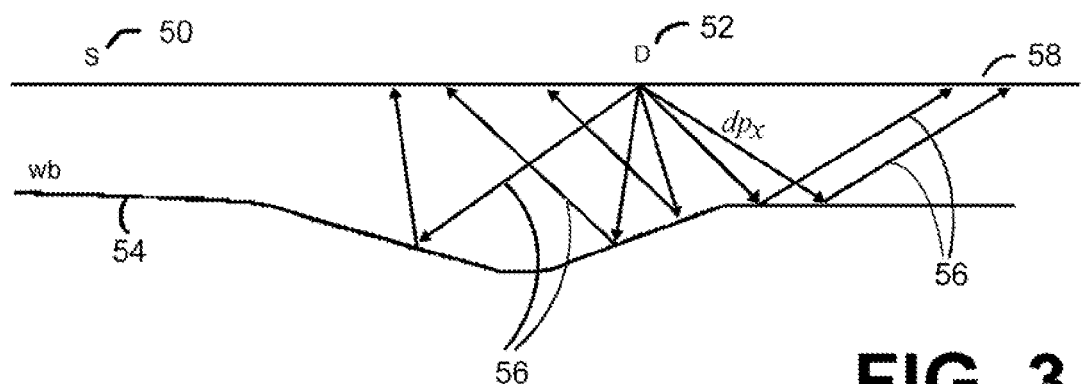
FIG. 3 illustrates one embodiment of the present invention wherein rays are sprayed from a detector location and are reflected off the water bottom surface of a marine environment.
Figure 4:
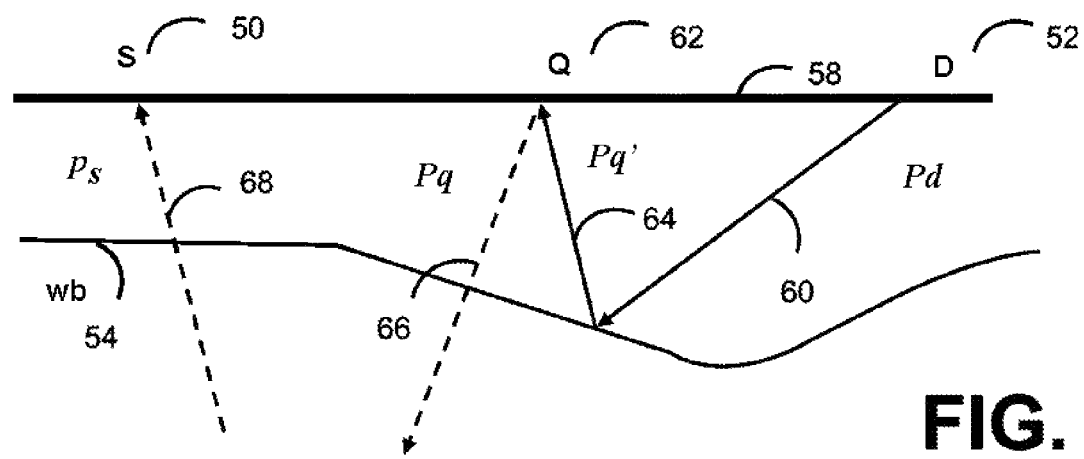
FIG. 4 illustrates one embodiment of the present invention wherein a primary beam corresponding to a given pegleg is determined through raytracing.
Figure 5:
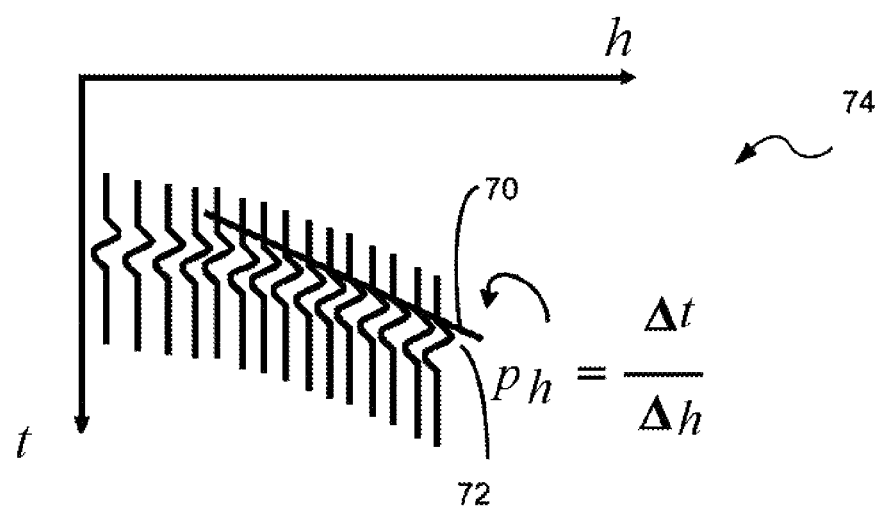
FIG. 5 illustrates a method utilized by one embodiment of the present invention to determine the stationary pegleg.
Figure 6:
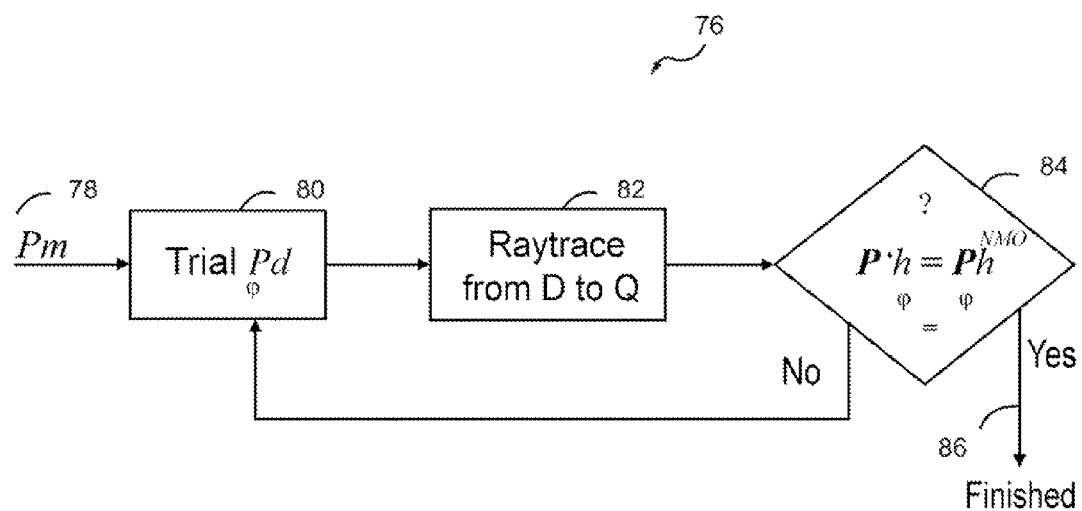
FIG. 6 illustrates a schematic drawing of the above method of determining the stationary pegleg used by one embodiment of the present invention.

FIGS. 4, 5 and 6 illustrate the manner in which the raytrace traveltime for the determination of the stationary pegleg may be calculated. An input beam is selected with a source location "S" 50 and a detector location "D" 52 as illustrated in FIG. 3. A multiple generating surface is determined, in this embodiment it is the water bottom ("wb") 54. In instances in which azimuth data will be implemented to determine the stationary pegleg, determining the multiple generating surface includes determining the three dimensional plane formed by the multiple generating surface. Rays 56 are sprayed from the detector D 52 which are reflected back from the multiple-generating surface wb 54 and reach the free surface 58. The angular interval for the rays 56 is predetermined to be $dp_x$ in the x (vertically downward from the free surface 58) direction and $dp_y$ in the y direction (perpendicular to the sheet). An individual ray 60 is selected with a given ray parameter or detector raypath dip $p_d$ and an arrival location Q 62 of the ray 60 is determined at the free surface 58 as illustrated in FIG. 4. The arrival direction (ray parameter $p_{q'}$ 64) of the ray 60 is determined at the arrival location Q 62.

The reflection at location Q 62 is determined and an outgoing ray parameter $p_q$ 66 is calculated. The locations S 50 and Q 62 and their ray parameters $p_s$ 68 and $p_q$ 66, and the shape of the multiple reflecting surface wb 54, determine the primary corresponding to the pegleg with locations D 52 and Q 62 and ray parameters $p_d$ 60 and $p_{q'}$ 64. By considering the azimuth of the selected input beam, the beam selection of the beam between points D 52 and Q 62 used to determine the location Q 62 is enhanced.

Although FIGS. 4 and 5 are shown in two dimensions, it will be appreciated that the process described accounts for three dimensional determinations of the primary corresponding to the pegleg with locations D 52 and Q 62 and ray parameters $p_d$ 60 and $p_{q'}$ 64, complete with determinations of the azimuth of the pegleg.

Finding the stationary raypaths that describe the reflection at location Q 62 requires a raypath search. The search is performed to find the separate reflections that occur at the various locations S 50, Q 62 and D 52. In one embodiment, the search compares the ray traced $p_h$ with the calculated $p_h$ ($p_h$ being the offset dip). The raytraced $p_h$ calculated as:

$$p_h = p_q - p_s \quad (1)$$

$$p_m = p_q + p_s \quad (2)$$

where $p_m$ (the midpoint dip) at a given location corresponds to a particular beam. The calculated $p_h$ obtained from the normal moveout equation:

$$p_h = \frac{\partial t}{\partial h} = \frac{\partial}{\partial h}\sqrt{T_0^2 + \left(\frac{2h\cos\theta_m}{V}\right)^2} \quad (3)$$

where t is time, h is the half offset, V is the NMO velocities, $T_0$ is zero-offset traveltime, and $$\cos\theta = \sqrt{1 - \left(\frac{1}{2}V \cdot p_m\right)^2}.$$

V and $T_0$ are derived from the stacking velocities obtained from the earth model. FIG. 5 illustrates the determination of $p_h$ where $p_h$ is the local slope 70 of the curve 72 in the h-t plot 74. The beam with the closest match between the raytraced $p_h$ and the calculated $p_h$ is selected as the stationary pegleg. The stacking velocities obtained from the earth model may be azimuthally dependent.

FIG. 6 illustrates a method 76 in which a stationary pegleg is determined. The operations of method 76 presented below are intended to be illustrative. In some embodiments, method 76 may be accomplished with one or more additional operations not described, and/or without one or more of the operations discussed. Additionally, the order in which the operations of method 76 are illustrated in FIG. 6 and described below is not intended to be limiting.

In some embodiments, method 76 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 76 in response to instructions stored electronically on an electronic storage medium. The one or more processing devices may include one or more devices configured through hardware, firmware, and/or software to be specifically designed for execution of one or more of the operations of method 76.

At an operation 78 a midpoint dip $p_m$ and azimuth φ are selected corresponding to a given source location S and a given detector location D. At an operation 80 and a trial $p_d$ is selected from the detector location D that, in conjunction with the $p_m$ chosen at operation 78, fixes the value of $p_s$ according to the relationship given in equation (2). This value can then be used to calculate $p_h$ according to the relationship given in equation (1). The parameter $p_d$ selected at operation 80 is used to perform a raytrace from the detector location D to a point Q selected between the source location S and the detector location D at an operation 82. The raytrace results in a raytraced offset dip $p_h'$ and azimuth φ', which are compared to a calculated offset dip $p_h$ and azimuth at an operation 84. If the raytraced $p_h'$ closely matches the calculated $p_h$ and azimuth φ' matches the calculated azimuth, then this process is complete and the beam corresponding to $p_m$ and azimuth φ is selected as the stationary pegleg at an operation 86. If the raytraced $p_h'$ does not match the calculated $p_h$ and/or the ratraced azimuth φ' does not match the calculated azimuth, then method 76 returns to operation 80 and another trial direction $p_d$ and azimuth φ is chosen until a satisfactory match between the raytraced $p_h'$, azimuth φ' and the calculated $p_h$, azimuth is obtained. This procedure will determine the detector-side pegleg. It will be appreciated that the roles of the source and the detector can then be interchanged to determine the source-side pegleg.

Figure 7:
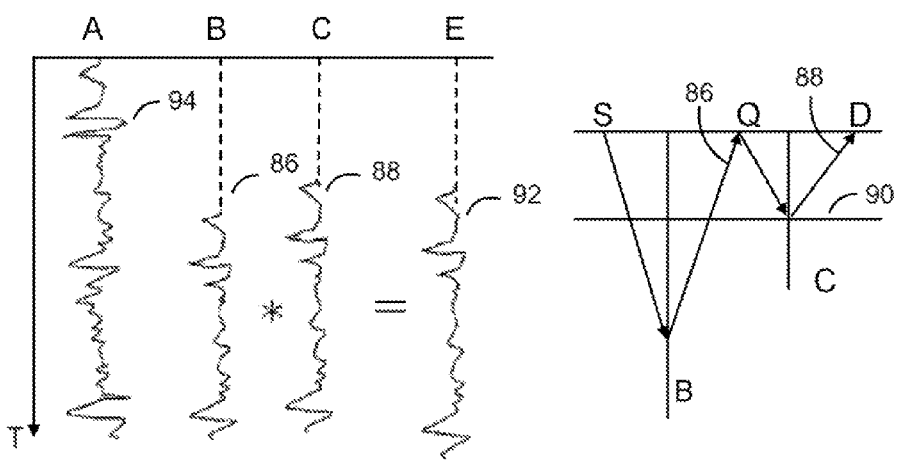
FIG. 7 illustrates one embodiment of the present invention wherein the primary beam is being convolved with the pegleg beam.

One embodiment includes convolving the predicted multiples beam with a segment of the modeled beam to obtain the convolved multiples beam. As illustrated in FIG. 7, a predicted multiples beam B 86 is convolved with the a segment of a modeled pegleg beam Q 88 starting at a multiple-generating surface 90. The result of the convolution is a beam E 92 which is the convolved multiples beam that is deconvolved with an input beam A 94 to remove multiples that are present in the input beam A 94.

Figure 8:
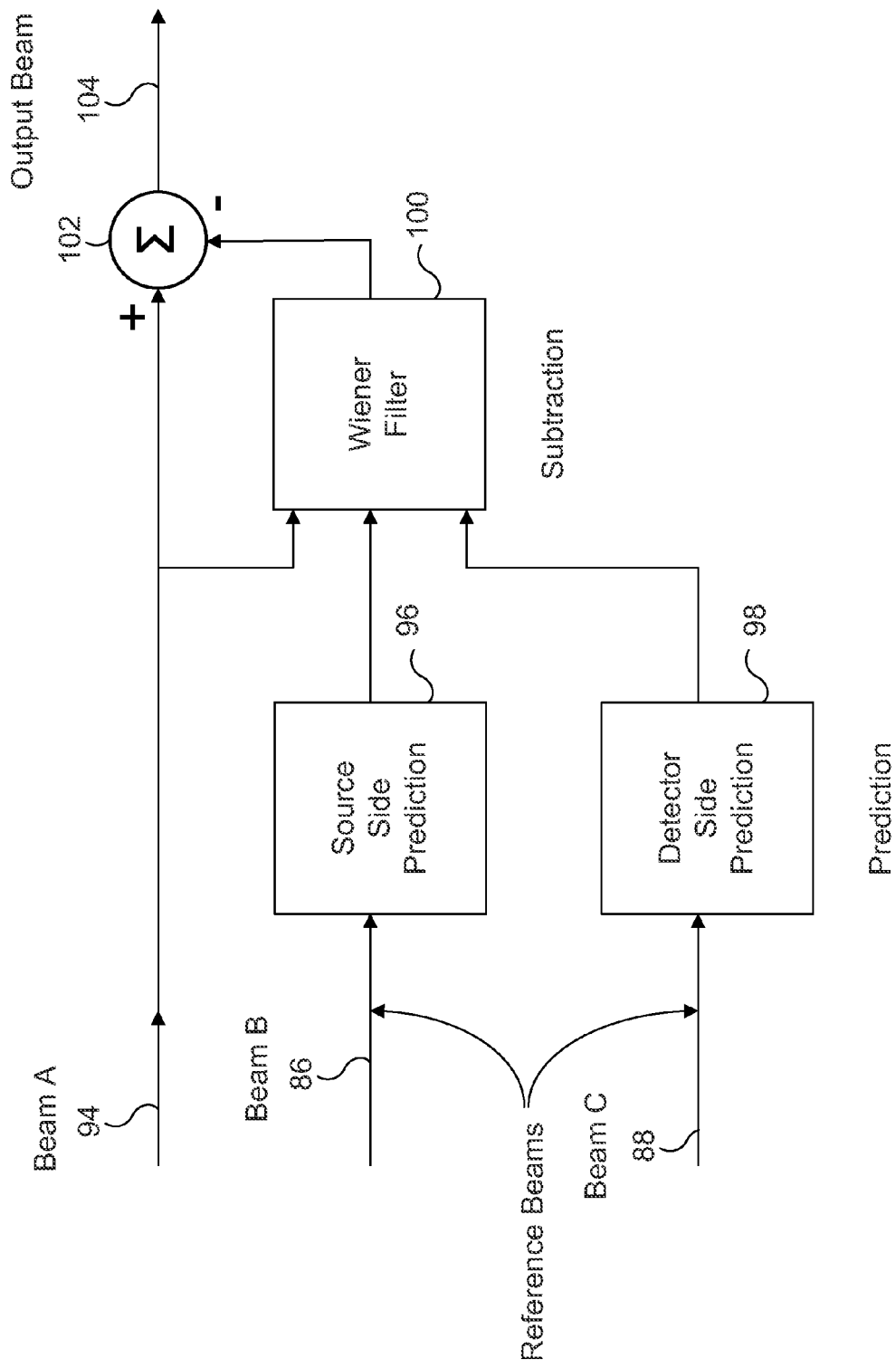
FIG. 8 illustrates a schematic drawing of a single-beam deconvolution that is utilized by one embodiment of the present invention.

A schematic illustration of this embodiment is provided in FIG. 8, wherein beam B 86 is utilized as the source side prediction 96, and beam C 88 is utilized for the detector side prediction 98. This embodiment utilizes a Wiener Filter 100 and inputs from beams A 94, B 86 and C 88 to generate an estimation of the multiples present in beam A 94. A Wiener filter is known in the art. In general, it is a causal filter which will transform an input into a desired output as closely as possible, subject to certain constraints. As one skilled in the art will appreciate there are other filters or means that can perform this particular function and they are intended to be within the scope of the present invention. Once the multiples in Beam A 94 have been determined, the multiples are then removed 102 from Beam A 94 to produce an output beam 104.

Figure 9:
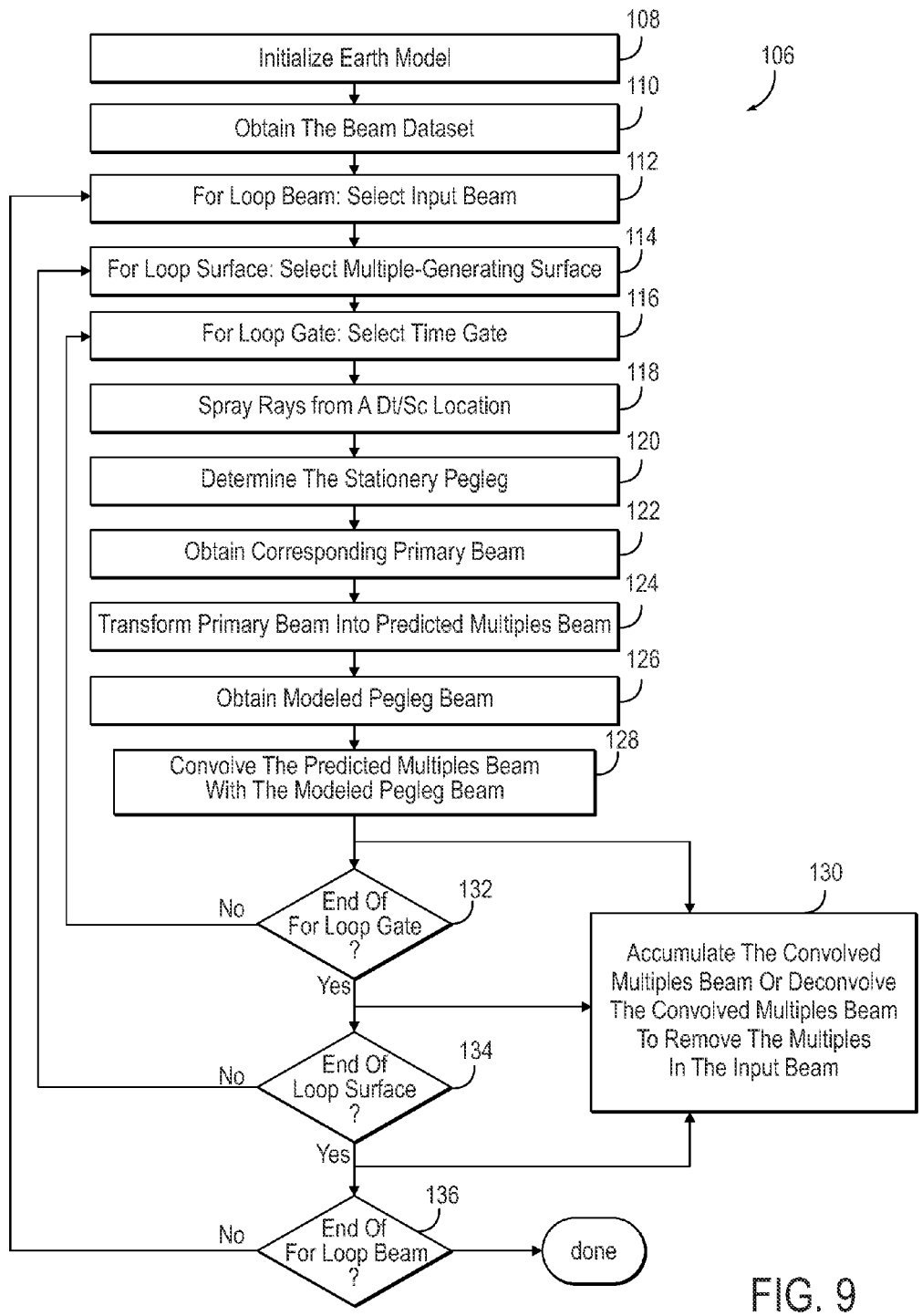
FIG. 9 illustrates a flow chart of another embodiment of the present invention for attenuating multiples in seismic data.

FIG. 9 illustrates a method 106 for removing multiples beams from input beams. The operations of method 106 presented below are intended to be illustrative. In some embodiments, method 106 may be accomplished with one or more additional operations not described, and/or without one or more of the operations discussed. Additionally, the order in which the operations of method 106 are illustrated in FIG. 9 and described below is not intended to be limiting.

In some embodiments, method 106 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 106 in response to instructions stored electronically on an electronic storage medium. The one or more processing devices may include one or more devices configured through hardware, firmware, and/or software to be specifically designed for execution of one or more of the operations of method 106.

At an operation 108, an earth model is initialized which correlates to a specific geologic volume of interest. At an operation 110, a beam dataset that has been determined from seismic data of the geologic volume of interest is also initiated. The seismic data is wide-azimuth data or other data types where azimuth information is an attribute. The beam data set includes information describing properties of a plurality of beams of seismic data through the geological volume of interest. The properties of the plurality of beams described by the beam data set include azimuth. Other properties described by the beam data set may include one or more of the midpoint and offset coordinates of central ray path, dip at the central ray location, trace sequence values associated with the central ray, and/or other properties As can be seen in FIG. 9, method 106 includes a series of loops wherein an input beam from the beam data set, a multiple-generating surface in the earth model, and a time gate are selected at operations 112, 114, and 116, respectively. At an operation 118, rays are sprayed from a detector or source location that is based on the input beam selected at operation 112. At an operation 120, a stationary pegleg is selected from one of the rays sprayed at operation 118 by comparing the properties of the rays, including azimuth, with the properties of the selected input beam. A primary beam corresponding to the pegleg is obtained at an operation 122. Obtaining the primary beam comprises determining properties of the primary beam, including the azimuth of the primary beam, the midpoint and offset coordinates of central ray path of the primary beam, dip of the primary beam at the central ray location, trace sequence values associated with the central ray of the primary beam, and/or other parameters of the primary beam based on the properties of the pegleg. At an operation 124, the primary bean is transformed into a predicted multiples beam by a shift corresponding to the traveltime of the ray corresponding to the stationary pegleg selected at operation 120. A modeled pegleg beam related to the predicted multiples beam is then generated at an operation 126. Generation of the predicted multiples beam comprises determining properties of the predicted multiples beam including azimuth of the predicted multiples beam, the midpoint and offset coordinates of central ray path of the predicted multiples beam, dip of the predicted multiples beam at the central ray location, trace sequence values associated with the central ray of the predicted multiples beam, and/or other parameters of the predicted multiples beam. A segment of the modeled pegleg beam which starts at the multiple-generating surface is convolved with the predicted multiples beam to obtain a convolved multiples beam at an operation 128. The convolved multiples beam is then either accumulated or deconvolved with the input beam to remove the multiples in the input beam at an operation 130. The accumulated beams can be used to reconstruct the multiple prediction as a seismic trace or be used to deconvolve with the input beam at a later time.

Any of a number of different points after convolution may be used to either accumulate the convolved multiples beam or deconvolve the convolved multiples beam to remove the multiples in the input beam at operation 130. Depending on the data being processed, those steps can occur before the end of the For loop for selecting the time gate 116-132 or immediately after that loop 116-132. Those steps can also occur after the For loop for selecting the multiple-generating surface 114-134 or after the For loop for selecting the input beam 112-136.

Figure 10:
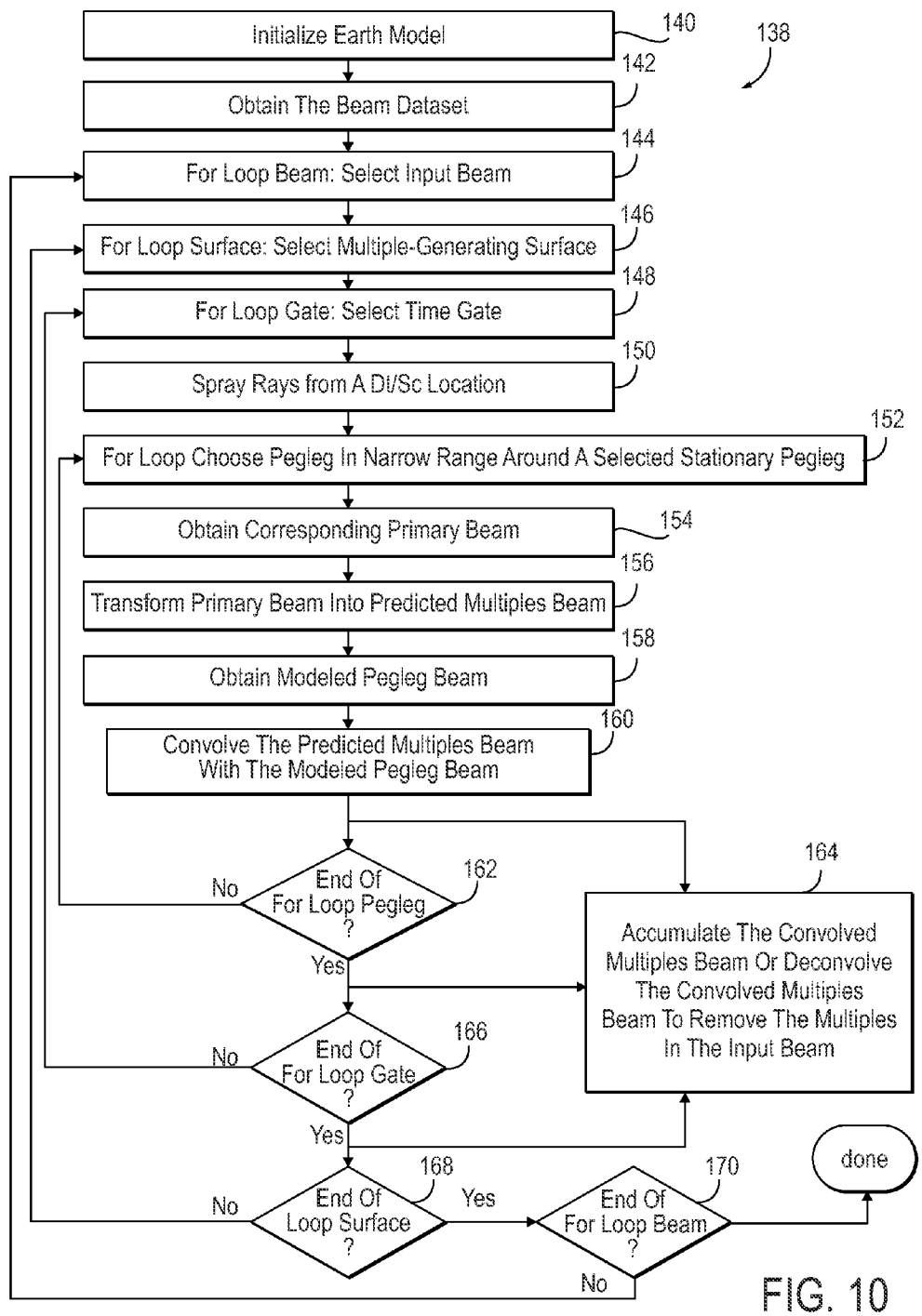
FIG. 10 illustrates a flow chart of a further embodiment of the present invention for attenuating multiples in seismic data.

FIG. 10 illustrates a method 138 for removing multiples beams from input beams. The operations of method 138 presented below are intended to be illustrative. In some embodiments, method 138 may be accomplished with one or more additional operations not described, and/or without one or more of the operations discussed. Additionally, the order in which the operations of method 138 are illustrated in FIG. 10 and described below is not intended to be limiting.

In some embodiments, method 138 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 138 in response to instructions stored electronically on an electronic storage medium. The one or more processing devices may include one or more devices configured through hardware, firmware, and/or software to be specifically designed for execution of one or more of the operations of method 138.

At an operation 140, an earth model is initialized which correlates to a specific geologic volume of interest. At an operation 142, a beam dataset that has been determined from seismic data of the geologic volume of interest is obtained. The seismic data is wide-azimuth data or other data types where azimuth information is an attribute. The beam data set includes information describing properties of a plurality of beams of seismic data through the geological volume of interest. The properties of the plurality of beams described by the beam data set include azimuth. Other properties described by the beam data set may include one or more of the midpoint and offset coordinates of central ray path, dip at the central ray location, trace sequence values associated with the central ray, and/or other properties As can be seen in FIG. 10, method 138 includes a series of loops wherein an input beam from the beam data set, a multiple-generating surface in the earth model, and a time gate are selected at operations 144, 146, and 148, respectively. At an operation 150, rays are sprayed from a detector or source location that is based on the input beam selected at operation 144.

At an operation 152, a pegleg is chosen from a narrow range around a selected stationary pegleg. A primary beam which corresponds to the chosen pegleg is obtained at an operation 154. Obtaining the primary beam comprises determining properties of the primary beam, including the azimuth of the primary beam, the midpoint and offset coordinates of central ray path of the primary beam, dip of the primary beam at the central ray location, trace sequence values associated with the central ray of the primary beam, and/or other parameters of the primary beam based on the properties of the chosen pegleg. At an operation 156, the primary beam is transformed into a predicted multiples beam. The modeled pegleg beam which relates to the predicted multiples beam is obtained at an operation 158. The predicted multiples beam is then convolved with a segment of the modeled pegleg beam to obtain a convolved multiples beam at an operation 160. The segment of the modeled pegleg beam utilized by operation 160 starts at the multiple-generating surface and ends at the detector or source location. Within the For loop for selecting the pegleg 152-162, the predictions or convolved multiples beam for the narrow range around the stationary are stacked. At an operation 164 the convolved multiples beam are accumulated or deconvolved to remove the multiples in the input beam. Operation 164 can occur after the For loop for selecting the pegleg 152-162, the For loop for selecting, the time gate 148-166, the For loop for selecting the multiple-generating surface 146-168, or the For loop for selecting the input beam 144-170.

Figure 11:
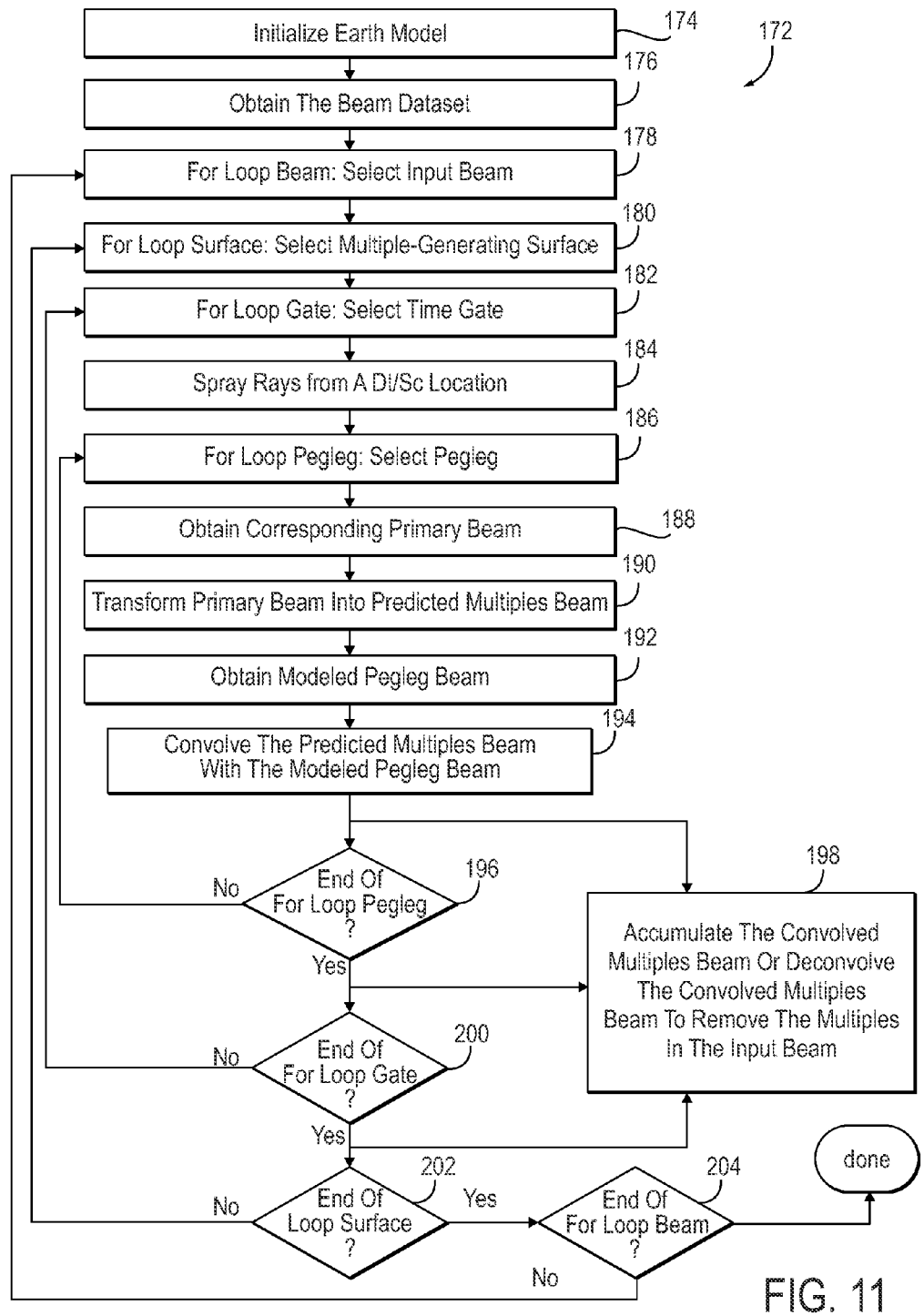
FIG. 11 illustrates a flow chart of one embodiment of the present invention for attenuating multiples in seismic data.

FIG. 11 illustrates a method 172 for removing multiples beams from input beams. The operations of method 172 presented below are intended to be illustrative. In some embodiments, method 172 may be accomplished with one or more additional operations not described, and/or without one or more of the operations discussed. Additionally, the order in which the operations of method 172 are illustrated in FIG. 11 and described below is not intended to be limiting.

In some embodiments, method 172 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 172 in response to instructions stored electronically on an electronic storage medium. The one or more processing devices may include one or more devices configured through hardware, firmware, and/or software to be specifically designed for execution of one or more of the operations of method 172.

At an operation 174, an earth model is initialized which correlates to a specific geologic volume of interest. At an operation 176, a beam dataset that has been determined from seismic data of the geologic volume of interest is obtained. The seismic data is wide-azimuth data or other data types where azimuth information is an attribute. The beam data set includes information describing properties of a plurality of beams of seismic data through the geological volume of interest. The properties of the plurality of beams described by the beam data set include azimuth. Other properties described by the beam data set may include one or more of the midpoint and offset coordinates of central ray path, dip at the central ray location, trace sequence values associated with the central ray, and/or other properties.

As can be seen in FIG. 11, method 172 includes a series of loops wherein an input beam from the beam data set, a multiple-generating surface in the earth model, and a time gate are selected at operations 178, 180, and 182, respectively. At an operation 184, rays are sprayed from a detector or source location that is based on the input beam selected at operation 178.

At an operation 186, a pegleg is selected. The pegleg selected at operation 186 is not tied to a stationary pegleg. The pegleg is used to obtain a corresponding primary beam at an operation 188. Obtaining the primary beam comprises determining properties of the primary beam, including the azimuth of the primary beam, the midpoint and offset coordinates of central ray path of the primary beam, dip of the primary beam at the central ray location, trace sequence values associated with the central ray of the primary beam, and/or other parameters of the primary beam based on the properties of the selected pegleg. The primary beam is transformed into a predicted multiples beam at operation 190, and a modeled pegleg beam is obtained at an operation 192 from the predicted multiples beam. A segment of the modeled pegleg beam that starts at the multiple-generating surface is convolved with the predicted multiples beam to obtain a convolved multiples beam at an operation 194. The convolved multiples beams that are generated within the For loop pegleg 186-196 are accumulated and/or deconvolved to remove the multiples in the input beam at an operation 198. Operation 198 can occur after the For loop for selecting the pegleg 186-196, the For loop for selecting the time gate 182-200, the For loop for selecting the multiple-generating surface 180-202, or the For loop for selecting the input beam 178-204.

Both the stationary pegleg and the pegleg can be determined for a variety of multiples. In one embodiment, the stationary pegleg or pegleg is determined for a source-side multiple. In one embodiment, the stationary pegleg or pegleg for is determined for a detector-side multiple. In one embodiment, the stationary pegleg or pegleg is determined for both source-side and the detector-side multiples.

Figure 12:
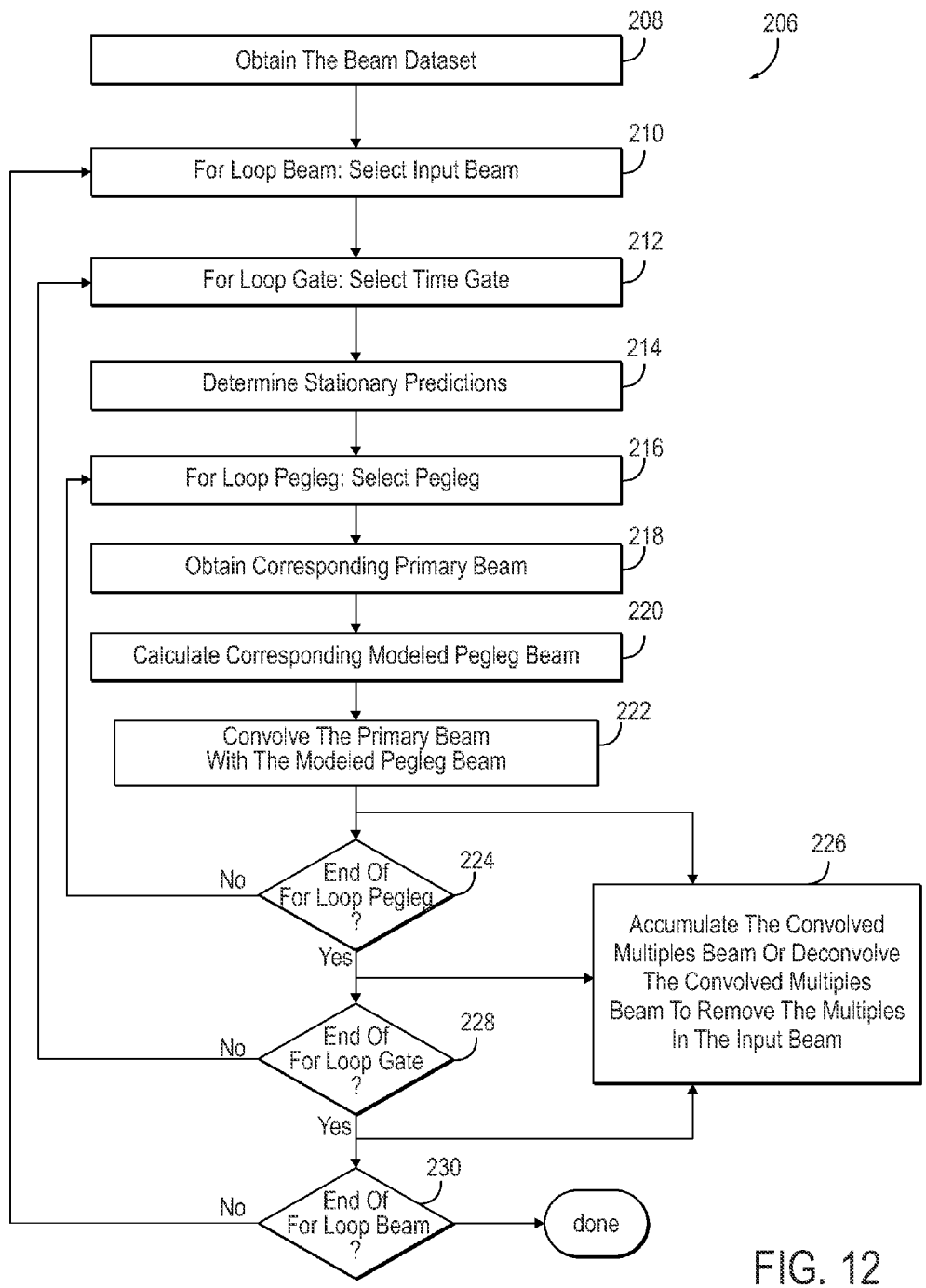
FIG. 12 illustrates a flow chart of another embodiment of the present invention for attenuating multiples in seismic data.

As one skilled in the art will appreciate, there may be situations in which an earth model is not readily available, in such instances, the present invention is still able to predict and attenuate multiples. By way of non-limiting example, FIG. 12 illustrates a method 206 of removing multiples from input beams that does not include the use of an earth model. The operations of method 206 presented below are intended to be illustrative. In some embodiments, method 206 may be accomplished with one or more additional operations not described, and/or without one or more of the operations discussed. Additionally, the order in which the operations of method 206 are illustrated in FIG. 12 and described below is not intended to be limiting.

In some embodiments, method 206 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 206 in response to instructions stored electronically on an electronic storage medium. The one or more processing devices may include one or more devices configured through hardware, firmware, and/or software to be specifically designed for execution of one or more of the operations of method 206.

At an operation 208, a beam dataset that has been determined from seismic data of a geologic volume of interest is obtained. The seismic data is wide-azimuth data or other data types where azimuth information is an attribute. The beam data set includes information describing properties of a plurality of beams of seismic data through the geological volume of interest. The properties of the plurality of beams described by the beam data set include azimuth. Other properties described by the beam data set may include one or more of the midpoint and offset coordinates of central ray path, dip at the central ray location, trace sequence values associated with the central ray, and/or other properties.

As can be seen in FIG. 12, method 206 includes a pair of loops wherein an input beam from the beam data set and a time gate are selected at operations 210 and 212, respectively. At an operation 214, an a-prior determination of stationary predictions is made. The determination of stationary predictions may be made at operation 214, for example, by assuming a layered earth model or determining the areal coverage of the source and detector or source locations. This determination of stationary predictions is leveraged at an operation 216. At an operation 218 a primary beam corresponding to the pegleg is obtained. A modeled pegleg beam corresponding to the primary beam is calculated at an operation 220. At an operation 222, the primary beam is convolved with the modeled pegleg beam. The convolved multiples beams that are generated within the For loop pegleg 216-224 are accumulated and/or deconvolved to remove the multiples in the input beam at an operation 226. Operation 226 can occur after the For loop for selecting the pegleg 216-224, the For loop for selecting the time gate 212-228, or the For loop for selecting the input beam 210-230.

Figure 13:
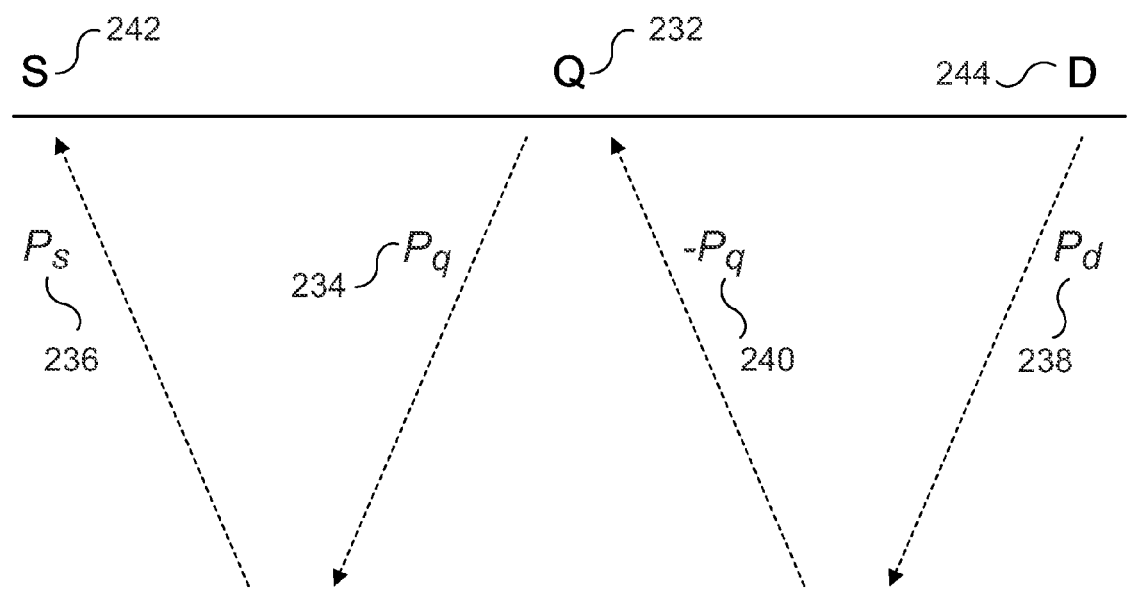
FIG. 13 illustrates one embodiment of the invention wherein a primary beam corresponding to a pegleg is determined without raytracing.

Referring now to FIG. 13, the above-described embodiments convolve a plurality of primary and pegleg beams for a range of locations Q 232 and a range of ray parameter values $P_q$ 234, $P_s$ 236, and azimuths. The range of Q 232 and the ranges $P_q$ 234, $P_s$ 236 (or $P_d$ 238), and azimuths is predetermined from an analysis of the input data. The ranges are determined so that enough beams are included to contain the stationary contribution for the modeled multiples that is amplified after summation of the stationary contribution with other non-stationary contributions. In FIG. 13 a beam with a given azimuth with ray parameter $P_m = P_s$ 236+$P_d$ 238, a location Q 232, and ray parameters $P_q$ 234 and $P_s$ 236 (or $P_d$ 238) are selected. The primary beam, having a primary beam azimuth, and a $P_{m1} = P_s$ 236+$P_q$ 234, and the pegleg beam having a pegleg beam azimuth and a $P_{m2} = P_d$ 238+$P_q$ 234, are determined. In this embodiment, there is an assumption made that the surface reflection at Q 232 is from $P_q$ 234 to –$P_q$ 240. The primary beam can then be convolved with the pegleg beam. In this embodiment, the primary beam and the pegleg beam are convolved for a range of location Q 232 values beginning at Q 232=(S 242+D 244)/2 or some other predetermined locations. In addition, the primary beam and the pegleg beam are convolved for a range of ray parameter $P_q$ 234 values.

As described-above, the embodiments of the present invention depicted in FIGS. 10-13 incorporate loops which illustrate that certain steps of those embodiments can be repeated depending on the data which is being processed.

Certain embodiments of the present invention described-above include spraying rays from the detector or source location to select the stationary pegleg or pegleg, it should be understood that there are another means of selecting the stationary pegleg or pegleg, for example, random selection, and those means are considered to within the scope of the present invention.

Figure 14:
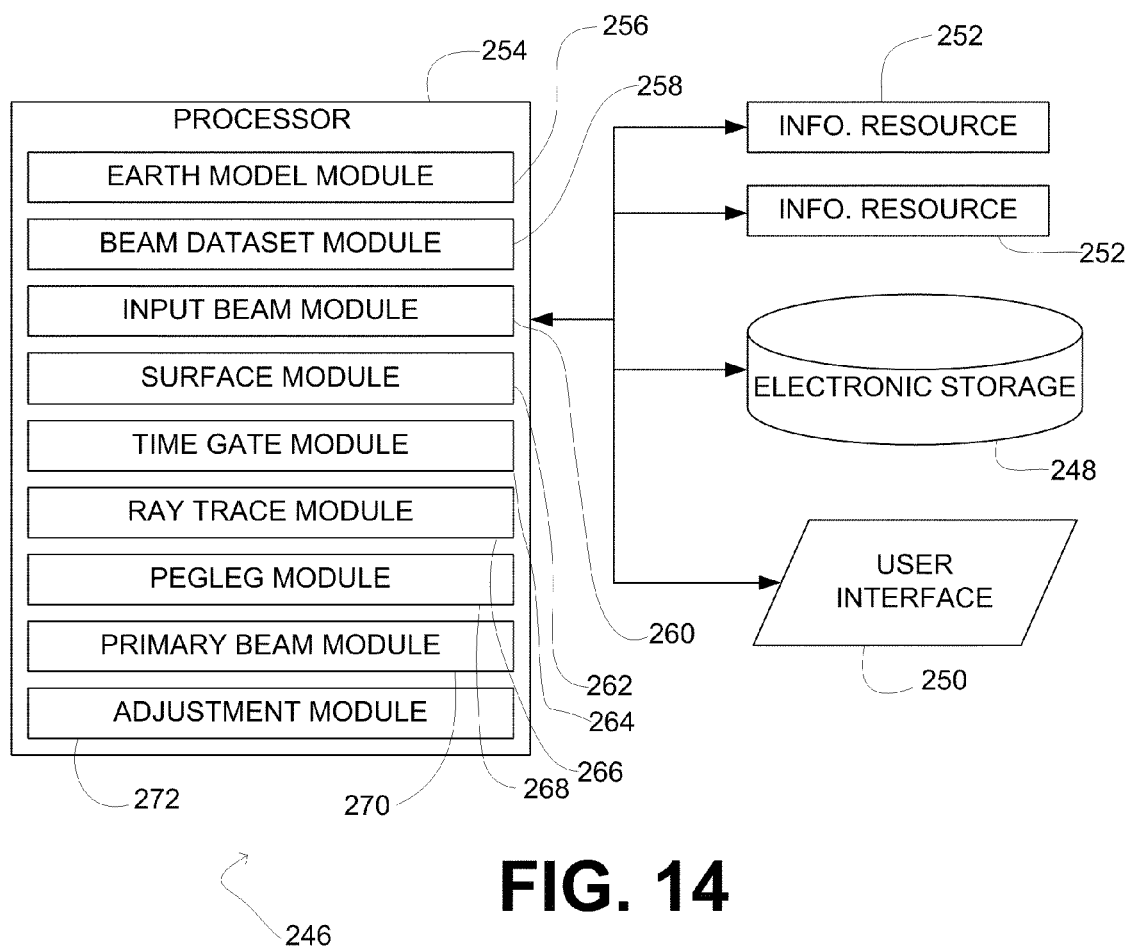
FIG. 14 illustrates a system configured to attenuate multiples in seismic data, in accordance with one embodiment of the invention.

FIG. 14 illustrates a system 246 configured to process seismic data representing the propagation of seismic energy through a geologic volume of interest. The seismic energy propagates through the geologic volume of interest from one or more source locations at or near the geologic volume of interest to one or more detector or source locations at or near the geologic volume of interest. In processing the seismic data, system 246 models the seismic energy as beams (e.g., Gaussian beams). System 246 may be configured to perform one or more of methods 10, 76, 106, 138, 172, and/or 206, shown in FIGS. 1, 6, and 9-12 and described above. The processing performed by system 246 removes multiples from selected input beams. In one embodiment, system 246 comprises electronic storage 248, a user interface 250, one or more information resources 252, one or more processors 254, and/or other components.

In one embodiment, electronic storage 248 comprises electronic storage media that electronically stores information. The electronic storage media of electronic storage 248 may include one or both of system storage that is provided integrally (i.e., substantially non-removable) with system 246 and/or removable storage that is removably connectable to system 246 via, for example, a port (e.g., a USB port, a firewire port, etc.) or a drive (e.g., a disk drive, etc.). Electronic storage 248 include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 248 may store software algorithms, information determined by processor 254, information received via user interface 250, information received from information resources 252, and/or other information that enables system 246 to function properly. Electronic storage 248 may be a separate component within system 246, or electronic storage 248 may be provided integrally with one or more other components of system 246 (e.g., processor 254).

User interface 250 is configured to provide an interface between system 246 and a user through which the user may provide information to and receive information from system 246. This enables data, results, and/or instructions and any other communicable items, collectively referred to as "information," to be communicated between the user and the system 246. As used herein, the term "user" may refer to a single individual or a group of individuals who may be working in coordination. Examples of interface devices suitable for inclusion in user interface 250 include a keypad, buttons, switches, a keyboard, knobs, levers, a display screen, a touch screen, speakers, a microphone, an indicator light, an audible alarm, and a printer. In one embodiment, user interface 250 actually includes a plurality of separate interfaces.

It is to be understood that other communication techniques, either hard-wired or wireless, are also contemplated by the present invention as user interface 250. For example, the present invention contemplates that user interface 250 may be integrated with a removable storage interface provided by electronic storage 248. In this example, information may be loaded into system 246 from removable storage (e.g., a smart card, a flash drive, a removable disk, etc.) that enables the user(s) to customize the implementation of system 246. Other exemplary input devices and techniques adapted for use with system 246 as user interface 250 include, but are not limited to, an RS-232 port, RF link, an IR link, modem (telephone, cable or other). In short, any technique for communicating information with system 246 is contemplated by the present invention as user interface 250.

The information resources 252 include one or more sources of information related to the geologic volume of interest and/or the process of generating an image of the geologic volume of interest. By way of non-limiting example, one of information resources 252 may include seismic data acquired at or near the geologic volume of interest, information derived therefrom, and/or information related to the acquisition. The seismic data may include individual traces of seismic data, or the data recorded at on one channel of seismic energy propagating through the geologic volume of interest from a source. The information derived from the seismic data may include, for example, a velocity model, a beam dataset including beam properties associated with beams used to model the propagation of seismic energy through the geologic volume of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the geologic volume of interest, and/or other information.

Processor 254 is configured to provide information processing capabilities in system 246. As such, processor 254 may include one or more of a digital processor, an analog processor, a digital circuit designed to process information, an analog circuit designed to process information, a state machine, and/or other mechanisms for electronically processing information. Although processor 254 is shown in FIG. 14 as a single entity, this is for illustrative purposes only.

In some implementations, processor 254 may include a plurality of processing units. These processing units may be physically located within the same device or computing platform, or processor 254 may represent processing functionality of a plurality of devices operating in coordination.

Processor 254 may be configured to execute one or more computer program modules. The one or more computer program modules may include one or more of an earth model module 256, a beam dataset module 258, an input beam module 260, a surface module 262, a time gate module 264, a ray tracing module 266, a pegleg module 268, a primary beam module 270, an adjustment module 272, and/or other modules. Processor 254 may be configured to execute modules 256, 258, 260, 262, 264, 266, 268, 270, and/or 272 by software; hardware; firmware; some combination of software, hardware, and/or firmware; and/or other mechanisms for configuring processing capabilities on processor 254.

It should be appreciated that although modules 256, 258, 260, 262, 264, 266, 268, 270, and 272 are illustrated in FIG. 14 as being co-located within a single processing unit, in implementations in which processor 254 includes multiple processing units, one or more of modules 256, 258, 260, 262, 264, 266, 268, 270, and/or 272 may be located remotely from the other modules. The description of the functionality provided by the different modules 256, 258, 260, 262, 264, 266, 268, 270, and/or 272 described below is for illustrative purposes, and is not intended to be limiting, as any of modules 256, 258, 260, 262, 264, 266, 268, 270, and/or 272 may provide more or less functionality than is described. For example, one or more of modules 256, 258, 260, 262, 264, 266, 268, 270, and/or 272 may be eliminated, and some or all of its functionality may be provided by other ones of modules 256, 258, 260, 262, 264, 266, 268, 270, and/or 272. As another example, processor 254 may be configured to execute one or more additional modules that may perform some or all of the functionality attributed below to one of modules 256, 258, 260, 262, 264, 266, 268, 270, and/or 272.

The earth model module 256 is configured to obtain an initialized earth model related to the geologic volume of interest. The initialized earth model may be obtained by initializing the earth model on process 254, or the initialized earth model may be obtained from electronic storage 248 and/or one of external information resources 252. In one embodiment, earth model module 256 is configured to perform one or more of operations 12, 108, 140, and/or 174 (shown in FIGS. 1 and 9-11, and described above).

The beam dataset module 258 is configured to obtain a beam dataset. The beam dataset may have been derived from wide-azimuth seismic data related to the geologic volume of interest, or other data types where azimuth information is an attribute. The beam dataset includes information describing properties of a plurality of beams of seismic data through the geologic volume of interest. The properties of the plurality of beams described by the beam data set include azimuth. Other properties described by the beam data set may include one or more of the midpoint and offset coordinates of central ray path, dip at the central ray location, trace sequence values associated with the central ray, and/or other properties. The beams described by the beam dataset may be Gaussian beams. Obtaining the beam dataset may include determining the beam dataset based on the wide-azimuth seismic data or other data types where azimuth information is an attribute, and/or obtaining the beam dataset may include obtaining the beam dataset from electronic storage 248 and/or one of external information resources 252. In one embodiment, beam dataset module 258 is configured to perform one or more of operations 14, 110, 142, 176, and/or 208 (shown in FIGS. 1 and 9-12, and described above).

The input beam module 260 is configured to select an input beam from the plurality of beams for which properties are described by the beam dataset obtained by beam dataset module 258. In one embodiment, input beam module 260 is configured to perform one or more of operations 16, 112, 144, 178, and/or 210 (shown in FIGS. 1 and 9-12, and described above).

The surface module 262 is configured to select a multiple-generating surface within the earth model obtained by earth model module 256. In one embodiment, surface module 262 is configured to perform one or more of operations 18, 114, 146, and/or 180 (shown in FIGS. 1 and 9-11, and described above).

The time gate module 264 is configured to select a time gate for a selected input beam and/or multiple-generating surface. In one embodiment, time gate module 264 is configured to perform one or more of operations 20, 116, 148, 182, and/or 212 (shown in FIGS. 1 and 9-12, and described above).

The ray tracing module 266 is configured to trace rays from a given detector or source location to another surface location. The rays traced by ray tracing module 266 may include rays that reverberate between a surface selected by surface module 262 and another surface. The given detector or source location from which rays are traced by ray tracing module 266 is the detector or source location that corresponds to the input beam selected by input beam module 260. In one embodiment, ray tracing module 266 is configured to perform one or more of operations 82, 118, 150, and/or 184 (shown in FIGS. 7 and 9-11, and described above).

The pegleg module 268 is configured to determine properties of one or more pegleg arrivals corresponding to the input beam. The pegleg arrival is determined or selected based on the information in the beam dataset describing properties of the input beam (including the azimuth of the input beam), rays traced by ray tracing module 266, the surface selected by surface module 262, stationary predictions, and/or other factors. The properties of the pegleg arrival include the azimuth of the pegleg arrival. The one or more pegleg arrivals determined by pegleg module 268 may include of a stationary pegleg and/or one or more peglegs that are not stationary. In one embodiment, pegleg module 268 may perform one or more of operations 22, 120, 152, 186 and/or 216 (shown in FIGS. 1 and 9-12, and described above).

The primary beam module 270 is configured to identify a primary beam from the beam dataset obtained by beam dataset module 258 that corresponds to the pegleg arrival determined and/or selected by pegleg module 268. This identification may be made by comparing properties of the beams described in the beam dataset with properties of the pegleg arrival. Certain ones of the properties may be compared for match, while others of the properties may be compared to determine if they correspond to each other. For example, based on the shape of the surfaces that reflect the pegleg arrival, primary beam module 270 may determine whether the azimuth of a given beam corresponds to the azimuth of the pegleg arrival.

It will be appreciated that in identifying a primary beam that corresponds to the pegleg arrival, primary beam module 270 may not find a "perfect" match for the pegleg arrival. The identification of the primary beam may be made based on a best fit, and/or a fit that satisfies one or more predetermined criteria. In one embodiment, primary beam module 270 is configured to perform one or more of operations 24, 122, 154, 188, and/or 218 (shown in FIGS. 1 and 9-12, and described above).

The adjustment module 272 is configured to adjust information in the beam dataset describing properties of the input beam to remove from the input beam one or more multiples arrivals associated with the primary beam. In one embodiment, to achieve this, adjustment module 272 (i) initiates properties of a model pegleg arrival related to the primary beam from the properties of the primary beam, wherein the properties initiated include azimuth, (ii) convolves the model pegleg arrival with the primary beam to determine properties of a convolved multiples beam that include the azimuth of the convolved multiples beam, and (iii) deconvolving the convolved multiples beam with the input beam to determine properties of the input beam, including azimuth, without influence from the multiples beam. In one embodiment, adjustment module 272 is configured to perform one or more of operations 26, 28, 30, 126, 128, 130, 158, 160, 164, 192, 194, and/or 198 (shown in FIGS. 1 and 9-12, and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of attenuating multiply reflected, surface-related seismic waves, wherein the method is implemented in a computer system comprising one or more processors configured to execute one or more computer program modules, the method comprising:
    obtaining, by the one or more processors, a beam dataset derived from data related to a geological volume where azimuth information is an attribute, wherein the beam dataset includes information describing properties of a plurality of beams of seismic data through the geological volume, and wherein the properties of the plurality of beams described by the beam dataset include azimuth;
    selecting, by the one or more processors, an input beam from the plurality of beams for which properties are described by the beam dataset;
    determining, by the one or more processors, properties of a pegleg arrival corresponding to the input beam, wherein the pegleg arrival is determined based in part on the information in the beam dataset describing properties of the input beam, including the azimuth of the input beam, and wherein the properties of the pegleg arrival determined include the azimuth of the pegleg arrival;
    identifying, by the one or more processors, a primary beam that corresponds to the pegleg arrival, wherein identifying the primary beam comprises identifying a beam described by the beam dataset having properties that correspond to the determined properties of the pegleg arrival, including a beam azimuth that corresponds to the beam azimuth of the pegleg arrival; and
    adjusting, by the one or more processors, information in the beam dataset describing properties of the input beam to remove one or more multiple arrivals associated with the primary beam from the input beam.

2. The method of claim 1, wherein adjusting information in the beam dataset describing properties of the input beam to remove one or more multiple arrivals associated with the primary beam from the input beam comprises:
    determining properties of a model pegleg arrival related to the primary beam based at least in part on the properties of the primary beam described by the beam dataset, wherein the properties of the model pegleg arrival include the azimuth of the model pegleg arrival;
    convolving the model pegleg arrival with the primary beam to determine properties of a convolved multiples beam, wherein the determined properties of the convolved multiples beam include azimuth; and
    deconvolving the convolved multiples beam with the input beam to determine properties of the input beam without the presence of the convolved multiples beam.

3. The method of claim 1, wherein identifying a beam described by the beam dataset having properties that correspond to the determined properties of the pegleg arrival comprises:
    predicting properties of the primary beam corresponding to the pegleg arrival from the properties of the pegleg arrival, wherein the predicted properties of the primary beam comprise azimuth; and
    comparing the predicted properties of the primary beam with the properties of the beams represented by the beam dataset to determine which of the beams having properties represented by the beam dataset has properties that most closely match the predicted properties of the primary beam, wherein comparing the predicted properties of the primary beam with the properties of beams represented by the beam dataset comprises comparing azimuths.

4. The method of claim 1, further comprising:
    initializing an earth model related to the geological volume; and
    selecting a multiple-generating surface from the earth model,
    wherein determining properties of a pegleg arrival corresponding to the input beam is based at least in part on the selected multiple-generating surface from the earth model.

5. The method of claim 1, wherein the beams for which parameters are described by information in the beam dataset comprise Gaussian beams.

6. A computer system configured to attenuate multiply reflected, surface-related seismic waves, the system comprising:
    one or more processors configured to execute one or more computer program modules, the one or more computer program modules comprising:
    a dataset module configured to obtain a beam dataset derived from seismic data related to a geological volume where azimuth information is an attribute, wherein the beam dataset includes information describing properties of a plurality of beams of seismic data through the geological volume; and wherein the properties of the plurality of beams described by the beam dataset include azimuth;
    an input beam module configured to select an input beam from the plurality of beams for which properties are described by the beam dataset;
    a pegleg module configured to determine properties of a pegleg arrival corresponding to the input beam, wherein the pegleg arrival is determined based in part on the information in the beam dataset describing properties of the input beam, including the azimuth of the input beam, and wherein the pegleg module is further configured such that the properties of the pegleg arrival determined include the azimuth of the pegleg arrival;

a primary beam module configured to identify a primary beam that corresponds to the pegleg arrival, wherein the primary beam module is configured to identify the primary beam by identifying a beam described by the beam dataset having properties that correspond to the determined properties of the pegleg arrival, including a beam azimuth that corresponds to the beam azimuth of the pegleg arrival; and an adjustment module configured to adjust information in the beam dataset describing properties of the input beam to remove one or more multiple arrivals associated with the primary beam Thorn the input beam.

7. The system of claim 6, wherein the adjustment module is configured such that adjusting information in the beam dataset describing properties of the input beam to remove one or more multiple arrivals associated with the primary beam from the input beam comprises:

initiating properties of a model pegleg arrival related to the primary beam based at least in part on the properties of the primary beam described by the beam dataset, wherein the properties of the model pegleg arrival include the azimuth of the model pegleg arrival;

convolving the model pegleg arrival with the primary beam to determine properties of a convolved multiples beam, wherein the determined properties of the convolved multiples beam include azimuth; and deconvolving the convolved multiples beam with the input beam to determine properties of the input beam without the presence of the convolved multiples beam.

8. The system of claim 6, wherein the primary beam module is configured such that identifying a beam described by the beam dataset having properties that correspond to the determined properties of the pegleg arrival comprises:

predicting properties of the primary beam corresponding to the pegleg arrival from the properties of the pegleg arrival, wherein the predicted properties of the primary beam comprise azimuth; and comparing the predicted properties of the primary beam with the properties of the beams represented by the beam dataset to determine which of the beams having properties represented by the beam dataset has properties that most closely match the predicted properties of the primary beam, wherein comparing the predicted properties of the primary beam with the properties of beams represented by the beam dataset comprises comparing azimuths.

9. The system of dam 6, wherein the one or more computer program modules further comprise:

an earth model module configured to initialize an earth model related to the geological volume; and a surface module configured to select a multiple-generating surface from the earth model, wherein the pegleg module is configured such that determining properties of a pegleg arrival corresponding to the input beam is based at least in part on the selected multiple-generating surface from the earth model.

10. The system of claim 6, wherein the beams for which parameters are described by information in the beam dataset comprise Gaussian beams.

11. A computer-implemented method of attenuating multiply reflected, surface-related seismic waves, wherein the method is implemented in a computer system comprising one or more processors configured to execute one or more computer program modules, the method comprising:

obtaining, by the one or more processors, a beam dataset derived from seismic data related to a geological volume where azimuth information is an attribute, wherein the beam dataset includes information describing properties of a plurality of beams of seismic data through the geological volume, and wherein the properties of the plurality of beams described by the beam dataset include azimuth;

selecting, by the one or more processors, an input beam from the plurality of beams for which properties are described by the beam dataset;

determining, by the one or more processors, properties of a first pegleg arrival corresponding to the input beam, wherein the first pegleg arrival is determined based in part on the information in the beam dataset describing properties of the input beam, including the azimuth of the input beam, and wherein the properties of the first pegleg arrival determined include the azimuth of the first pegleg arrival;

identifying, by the one or more processors, a first primary beam that corresponds to the first pegleg arrival, wherein identifying the first primary beam comprises identifying a beam described by the beam dataset having properties that correspond to the determined properties of the first pegleg arrival, including a beam azimuth that corresponds to the beam azimuth of the first pegleg arrival;

determining, by the one or more processors, properties of a first model pegleg arrival related to the first primary beam based at least in part on the properties of the first primary beam described by the beam dataset, wherein the properties of the first model pegleg arrival include the azimuth of the first model pegleg arrival;

convolving, by the one or more processors, the first model pegleg arrival with the first primary beam to determine properties of a first convolved multiples beam, wherein the determined properties of the first convolved multiples beam include azimuth;

determining, by the one or more processors, properties of a second pegleg arrival corresponding to the input beam, wherein the second pegleg arrival is determined based in part on the information in the beam dataset describing properties of the input beam, including the azimuth of the input beam, and wherein the properties of the second pegleg arrival determined include the azimuth of the second pegleg arrival;

identifying, by the one or more processors, a second primary beam that corresponds to the second pegleg arrival, wherein identifying the second primary beam comprises identifying a beam described by the beam dataset having properties that correspond to the determined properties of the second pegleg arrival, including a beam azimuth that corresponds to the beam azimuth of the second pegleg arrival;

determining, by the one or more processors, properties of a second model pegleg arrival related to the second primary beam based at least in part on the properties of the second primary beam described by the beam dataset, wherein the properties of the second model pegleg arrival include the azimuth of the second model pegleg arrival;

convolving, by the one or more processors, the second model pegleg arrival with the second primary beam to determine properties of a second convolved multiples beam, wherein the determined properties of the second convolved multiples beam include azimuth;

accumulating, by the one or more processors, a plurality of convolved multiples beams, wherein the plurality of convolved multiples beams comprise the first convolved multiples beam and the second convolved multiples beam;

adjusting, by the one or more processors, information in the beam dataset describing properties of the input beam to account for the accumulated plurality of convolved multiple beams.

12. The method of claim 11, wherein identifying a beam described by the beam dataset having properties that correspond to the determined properties of the first pegleg arrival comprises:
predicting properties of the first primary beam corresponding to the first pegleg arrival from the properties of the first pegleg arrival, wherein the predicted properties of the first primary beam comprise azimuth; and
comparing the predicted properties of the first primary beam with the properties of the beams represented by the beam dataset to determine which of the beams having properties represented by the beam dataset has properties that most closely match the predicted properties of the first primary beam, wherein comparing the predicted properties of the first primary beam with the properties of beams represented by the beam dataset comprises comparing azimuths.

13. The method of claim 12, wherein wherein identifying a beam described by the beam dataset having properties that correspond to the determined properties of the second pegleg arrival comprises:
predicting properties of the second primary beam corresponding to the second pegleg arrival from the properties of the second pegleg arrival, wherein the predicted properties of the second primary beam comprise azimuth; and
comparing the predicted properties of the second primary beam with the properties of the beams represented by the beam dataset to determine which of the beams having properties represented by the beam dataset has properties that most closely match the predicted properties of the second primary beam, wherein comparing the predicted properties of the second primary beam with the properties of beams represented by the beam dataset comprises comparing azimuths.

14. The method of claim 11, wherein determining properties of the first pegleg and determining properties of the second pegleg comprise spraying rays from a detector or source location associated with the input beam, and wherein the first pegleg and the second pegleg are each related to one of the rays sprayed from the detector or source location.

15. The method of claim 11, wherein the beams for which parameters are described by information in the beam dataset comprise Gaussian beams.

* * * * *